US009540187B2

(12) United States Patent
Valerino, Sr.

(10) Patent No.: US 9,540,187 B2
(45) Date of Patent: *Jan. 10, 2017

(54) METHOD AND SYSTEM FOR SEALING PRODUCTS IN A PNEUMATIC TUBE CARRIER

(71) Applicant: Fredrick M. Valerino, Sr., Timonium, MD (US)

(72) Inventor: Fredrick M. Valerino, Sr., Timonium, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,179

(22) Filed: Jul. 28, 2014

(65) Prior Publication Data
US 2014/0334886 A1   Nov. 13, 2014

Related U.S. Application Data

(63) Continuation of application No. 14/069,083, filed on Oct. 31, 2013, now Pat. No. 8,790,047, which is a continuation-in-part of application No. 13/914,311, filed on Jun. 10, 2013, now Pat. No. 8,647,021, which is a continuation of application No. 13/252,176, filed
(Continued)

(51) Int. Cl.
*B65G 51/42* (2006.01)
*B65G 51/04* (2006.01)
*B65B 31/04* (2006.01)
*B65B 51/14* (2006.01)
(Continued)

(52) U.S. Cl.
CPC ............ *B65G 51/42* (2013.01); *B65B 31/046* (2013.01); *B65B 51/146* (2013.01); *B65G 51/04* (2013.01); *B65G 51/06* (2013.01); *B65G 51/28* (2013.01)

(58) Field of Classification Search
USPC ...... 406/4, 110, 112; 700/225, 226, 229, 230
See application file for complete search history.

(56) References Cited

U.S. PATENT DOCUMENTS 5,217,328 A * 6/1993 Lang ...................... B65G 51/40
                                                    406/1
5,712,789 A * 1/1998 Radican ................ G06Q 10/08
                                                    700/226
(Continued)

OTHER PUBLICATIONS

Ex Parte Reexamination of U.S. Pat. No. 8,700,207, filed May 20,2014, Control U.S. Appl. No. 90/013,247.
(Continued)

*Primary Examiner* — Joseph Dillon, Jr.
(74) *Attorney, Agent, or Firm* — Kelley Drye & Warren LLP

(57) ABSTRACT

A pneumatic tube system, including at least one system control module for controlling delivery of a pneumatic carrier through pneumatic tubing. The system includes at least one pneumatic tube station having a sealer, the sealer includes a heating pad and a sealing strip, where the sealer automatically grips the open end within the heating pad and the sealing strip upon insertion of the bag into the system. In one example, the sealer creates a vacuum to extract air from an interior space of the bag. The sealer applies heat to the open end to seal the bag. The system includes at least one pneumatic tube station configured for sending at least one carrier, the at least one sending pneumatic tube station being in signal communication with the at least one system control module, where the at least one carrier is sent through the system by pneumatic tubing.

19 Claims, 8 Drawing Sheets

Related U.S. Application Data on Oct. 3, 2011, now Pat. No. 8,491,225, which is a continuation of application No. 12/462,167, filed on Jul. 29, 2009, now Pat. No. 8,029,212.

(51) Int. Cl.
*B65G 51/06* (2006.01)
*B65G 51/28* (2006.01)

(56) References Cited

U.S. PATENT DOCUMENTS

| | | | | |
|---|---|---|---|---|
| 5,765,341 A * | 6/1998 | Insley | B65D 81/2061 | 53/400 |
| 5,805,454 A * | 9/1998 | Valerino, Sr. | B01F 11/0005 | 700/215 |
| 5,864,485 A * | 1/1999 | Hawthorne | B65G 51/36 | 104/88.04 |
| 5,896,297 A * | 4/1999 | Valerino, Sr. | G05B 19/41895 | 700/213 |
| 6,048,086 A * | 4/2000 | Valerino, Sr. | B01F 11/0005 | 514/474 |
| 6,173,212 B1 * | 1/2001 | Valerino, Sr. | B65G 51/34 | 700/218 |
| 6,477,442 B1 * | 11/2002 | Valerino, Sr. | B65G 51/34 | 414/730 |
| 6,712,561 B1 * | 3/2004 | Valerino, Sr. | A61B 19/0288 | 406/117 |
| 7,135,976 B2 * | 11/2006 | Neff | G01S 13/08 | 340/539.13 |
| 7,260,447 B2 * | 8/2007 | Osborne | B01F 11/0005 | 700/216 |
| 7,363,106 B1 * | 4/2008 | Hoganson | B65G 51/44 | 406/110 |
| 7,751,930 B2 * | 7/2010 | Valerino, Sr. | B65G 51/06 | 406/2 |
| 7,953,515 B2 * | 5/2011 | Hoganson | B65G 51/44 | 700/213 |
| 8,116,906 B2 * | 2/2012 | Valerino, Sr. | G06Q 10/00 | 700/226 |
| 8,151,835 B2 * | 4/2012 | Khan | B65B 3/003 | 141/10 |
| 8,447,427 B2 * | 5/2013 | Hoganson | B65G 51/44 | 700/225 |
| 8,700,207 B2 * | 4/2014 | Valerino, Sr. | G06Q 10/00 | 700/229 |
| 8,775,198 B2 * | 7/2014 | Wiener | G06Q 50/22 | 705/2 |
| 8,825,203 B2 * | 9/2014 | Valerino, Sr. | B65G 51/42 | 700/229 |
| 8,973,338 B2 * | 3/2015 | Terzini | B65G 51/20 | 406/191 |
| 9,139,383 B2 * | 9/2015 | Hoganson | B65G 51/44 | |
| 9,221,626 B2 * | 12/2015 | Hoganson | B65G 51/42 | |
| 2001/0056311 A1 * | 12/2001 | Valerino, Sr. | B65G 51/06 | 700/214 |
| 2005/0273196 A1 * | 12/2005 | Valerino, Sr. | B65G 51/06 | 700/230 |
| 2006/0161295 A1 * | 7/2006 | Yun | G06F 19/3462 | 700/236 |
| 2010/0100226 A1 * | 4/2010 | Valerino, Sr. | G06Q 10/00 | 700/215 |
| 2011/0142554 A1 * | 6/2011 | Terzini | B65G 51/06 | 406/189 |
| 2011/0270440 A1 * | 11/2011 | Hoganson | B65G 51/36 | 700/230 |
| 2012/0209421 A1 * | 8/2012 | Valerino, Sr. | G06Q 10/00 | 700/225 |
| 2014/0094962 A1 * | 4/2014 | Valerino, Sr. | B65G 51/42 | 700/226 |
| 2014/0135978 A1 * | 5/2014 | Valerino, Sr. | G06Q 10/00 | 700/229 |
| 2015/0025675 A1 * | 1/2015 | Valerino, Sr. | B65G 51/04 | 700/226 |

OTHER PUBLICATIONS

Office Action in Ex Parte Reexamination, mailed Jun. 25, 2014.
Final Office Action in Ex Parte Reexamination, mailed Sep. 24, 2014.
Ex Parte Reexamination of U.S. Pat. No. 8,116,906, filed Feb. 14, 2012, Control U.S. Appl. No. 90/012,144.
Ex Parte Reexamination of U.S. Pat. No. 8,116,906, filed Sep. 14, 2012, Control U.S. Appl. No. 90/012,618.

* cited by examiner

METHOD AND SYSTEM FOR SEALING PRODUCTS IN A PNEUMATIC TUBE CARRIER

CROSS-REFERENCE TO RELATED APPLICATIONS

This application is a continuation of U.S. application Ser. No. 14/069,083, filed Oct. 31, 2013, which is a continuation-in-part of U.S. application Ser. No. 13/914,311, filed Jun. 10, 2013, which is a continuation of U.S. application Ser. No. 13/252,176, filed Oct. 3, 2011, now U.S. Pat. No. 8,491,225, which is a continuation of U.S. application Ser. No. 12/462,167, filed Jul. 29, 2009, now U.S. Pat. No. 8,029,212, the entire contents of the entire chain of applications hereby being incorporated by reference.

FIELD OF THE INVENTION

This invention relates to the field of packaging systems for pneumatic tube delivery system, and more specifically, to a system and method for sealing a bag in a pneumatic tube material delivery system in order to secure its contents during transport in a pneumatic tube delivery system and tracking the sealed bag and its contents within the pneumatic tube delivery system.

BACKGROUND OF THE INVENTION

In large institutional settings such as hospitals, the dispensing and delivery of drugs has become a time consuming process. In particular, sterile items, controlled medications, biological samples, and the like need to be prepared and transported in a secure environment while ensuring the safety of patients and hospital workers.

Transporting objects via pneumatic tubes is known to the art. Pneumatic delivery systems are used extensively for the rapid and efficient transportation of a wide variety of articles. These delivery systems are used in a number of business operations, including, but not limited to, banks, hospitals, office buildings, industrial plants, and transportation terminals for transporting a carrier containing objects from one location to another.

To send an object via a pneumatic tube, an object is placed within a carrier, which is then transported within enclosed pneumatic tubing by air under either positive or negative pressure to a desired destination. The interior of the closed tube and the outer dimension of the carrier form a seal so that the carrier can be propelled between the destinations by a vacuum or positive air pressure. These Pneumatic delivery systems typically comprise a number of substantially hermetically sealed tubes extending between locations in a building and a mechanism for selectively evacuating air from, or forcing air into, the tubes. In use, objects are placed in a carrier vessel, typically a substantially cylindrical housing, which is placed into the pneumatic tube transport system. The vessel is then propelled through the tube by creating a zone of relatively higher pressure on one side of the carrier vessel than on the other. This may be accomplished by creating a zone of negative pressure (e.g., a vacuum) in front of the vessel or by creating a zone of positive pressure behind the vessel.

One specific area of commerce, which currently uses the pneumatic tube for transporting materials, is the hospital or biomedical research/manufacturing industry. Pneumatic tube delivery systems have proven to be particularly useful for transporting blood samples, medicines, intravenous bags, viral samples or other biological or chemical matter within hospitals or laboratories. Some of the items transported may be highly addictive drugs (i.e. morphine) which need to be tightly controlled, or hazardous fluids or solids that need to be transported in a secure package to prevent spillage of the hazardous items during delivery.

In certain settings, the objects include containers housing fluids that need to be transported using the pneumatic tube transport system. For example, in the health care setting pneumatic tube transport systems are well adapted for transporting fluids such as laboratory samples, blood samples or other body fluids, or intravenous bags between areas of the building. However, when using pneumatic tube transport systems in the health care field, it is critical that the carrier vessels be suitable for transporting fluids. More particularly, it is necessary that the carrier vessels, upon closure, seal to provide substantially leak-proof containment of fluids, which may unwantedly spill from their primary containers into the vessel. Fluids, which spill from their primary containers inside the vessel, may leak from the vessel into the pneumatic tube posing a health risk and resulting in a risk that the pneumatic tubes may not properly function due to the presence of fluid in the system.

Current packaging systems utilize zip-lock bags, fold-over-type bags, wrapped in papers, newspapers, or placed in foam-lines pneumatic carriers to transport these items in such pneumatic tube systems. Moreover, urine-sample containers are placed in zip-lock bags and transported unprotected in these pneumatic carriers. As such, spillages are frequently seen contaminating products, carriers, and the systems, which carry these samples requiring costly clean-ups and down time in these pneumatic tube systems.

Thus, there is clearly a need for a system and method for safely and securely sealing material and transporting in a pneumatic tube carrier delivery system to protect users from spillage during transport of the material within the pneumatic tube carrier delivery system. There is also a need for a system and method for providing tracking of the sealed material in the pneumatic tube carrier delivery system to ensure the secure delivery of carrier contents to authorized end users.

SUMMARY OF THE INVENTION

An object of the invention is to overcome the drawbacks of previous inventions.

Another object of the invention is to provide a novel and useful packaging system contained in a pneumatic tube station.

Another object of the system is to provide a novel and useful heat-sealed packaging that protects specimens, pharmaceuticals during delivery.

Another object of the invention is to provide a method of safely sealing specimens and pharmaceuticals in order to protect the contents from jarring as they travel through a pneumatic tube system.

Another object of the invention is to provide a method of safely sealing products in order to prevent cross-contamination of products.

Another object of the invention is to provide tracking of the sealed material in the pneumatic tube carrier delivery system to ensure the secure delivery of carrier contents to authorized end users.

In a first non-limiting aspect of the invention, a system for sealing a carrier package is provided and includes a carrier package having an interior space, where the carrier package includes an open edge and a three sealed edges; and a sealer for receiving an open end of the carrier package, where the sealer seals to carrier package in response to a user inserting the carrier package into the sealer.

In a second non-limiting aspect of the invention, a pneumatic tube system is provided for the storage, retrieval and distribution of pneumatic tube carriers to and from a plurality of location within a pneumatic tube system, including a device for sealing a bag, where the bag includes an interior space, an open end and three closed ends. The device includes a sealer for receiving an open end of the bag, which extracts air from the interior space in response to a user inserting the carrier package into the sealer to form a sealed carrier package. The pneumatic tube system also includes at least one computer having a database capable of receiving and transmitting information within the pneumatic tube system; at least one empty pneumatic tube carrier for receiving the sealed bag, with the carrier being generally cylindrical and disposed about a longitudinal axis; separate carrier storage and distribution means for storing and distributing the empty pneumatic tube carriers on demand; and at least one control means for coordinating the storing and distributing of the empty pneumatic carriers to and from active stations within the pneumatic tube system; where the carrier storage and distribution means is connected to the pneumatic tube system via the distribution means. The empty carriers are distributed to one of the empty carrier storage device and the receiving stations within the pneumatic tube system in response to the information; and where the distribution means distributes the empty carriers within the pneumatic tube system.

In a fourth non-limiting embodiment, a pneumatic tube system if provided and includes at least one system control module comprising at least one database module; and at least one computer control center module in signal communication with said database module. The pneumatic tube system includes at least one pneumatic tube station having a sealer, the sealer having a heating pad and a sealing strip, where the sealer automatically grips the open end within the heating pad and the sealing strip upon insertion of the bag into the system. The sealer creates a vacuum to extract air from an interior space of the bag, and where the sealer applies heat to the open end to seal the open end. The pneumatic tube station is configured for sending at least one carrier, the at least one sending pneumatic tube station being in signal communication with the at least one system control module, wherein the at least one carrier is sent through the system by pneumatic tubing. The at least one system control module captures tracking information associated with sending and receiving the at least one carrier, and where the at least one computer control center module is configured to receive the delivery information from the at least one pneumatic tube station. The at least one database module is configured to store delivery information from the computer control center module, and the at least one computer control center module is configured to interpret delivery information and send commands to the system to control routing of the at least one carrier in the pneumatic tubing.

In a fifth non-limiting aspect of the invention, a method of sealing a carrier bag is provided and includes providing an article-containing carrier bag, where the carrier bag has an open end and opposite plurality of closed ends; inserting the open end into a slot located in a sealing apparatus; gripping the carrier bag in the sealing apparatus; applying heat and pressure to the open end for a predetermined time to seal the carrier bag.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems and methods for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present principles, reference is now made to the following figures.

DETAILED DESCRIPTION OF THE EMBODIMENTS OF THE INVENTION

The invention may be understood more readily by reference to the following detailed description of preferred principles of the invention. However, techniques, systems and operating structures in accordance with the preferred principles may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise. Some elements of the present principles are illustrated as modules for performing described functions. While these modules may be described in terms of software implementations, any hardware, or combination of hardware and software may be used to implement the present principles without deviating from the scope or spirit thereof. Moreover, well known methods and procedures for both carrying out the objectives of the present principles and illustrating the preferred embodiment are incorporated herein but have not been described in detail as not to unnecessarily obscure novel aspects of the present principles.

Figure 1:
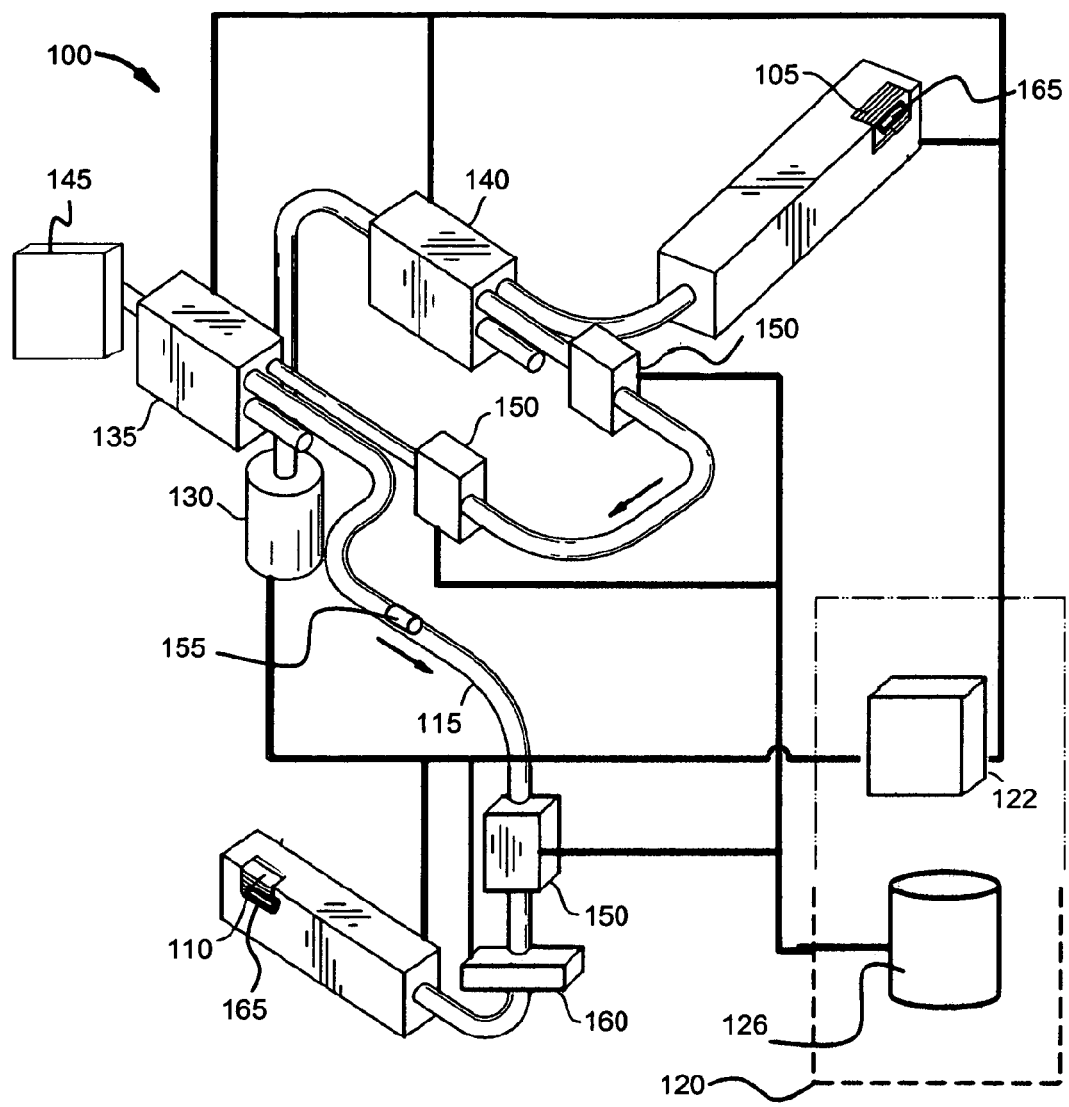
FIG. 1 is a diagram illustrating an automatic pneumatic tube system according to a preferred embodiment of the invention.

Referring now to FIG. 1, there is shown a diagram illustrating a pneumatic tube system 100 according to an embodiment of the invention. The pneumatic tube system 100 utilizes, in one non-limiting embodiment, a plurality of pneumatic tube stations 105, 110 for sending and receiving a pneumatic carrier 155. The pneumatic tube stations 105, 110 are substantially the same and include a sealer system 165 for sealing the contents in a sealer bag. The pneumatic tube stations 105, 110 are in communication with each other through pneumatic tube 115 and a system control module 120 for initiating and sending of pneumatic carriers 155. FIG. 1 illustrates a one zone pneumatic tube system 100, although in other non-limiting embodiments, any number of pneumatic tube stations, such as pneumatic tube station 105 may be incorporated into pneumatic tube system 100 without deviating from the scope of the invention. The pneumatic tube system 100 also includes blower 130 and one or more diverters 135, 140 which direct the transportation of pneumatic carrier 155 from storage compartment 145 to pneumatic tube stations 105, 110. It should be appreciated that pneumatic tube stations 105, 110 may be utilized as either sending station or receiving station at the direction of the system control module 120.

Pneumatic tube system 100 may include a plurality of inline identifying tag readers or optical sensors 150 configured to track or sense the ID tags on the pneumatic carrier 155 as it is transported through pneumatic tube 115. The inline identifying tag readers or optical sensors 150 may be implemented, for example, through a window or a section of the pneumatic tube 115, through an RFID antenna (not shown) disposed on a recess section of the pneumatic tube 115, through an optical sensor disposed in the pneumatic tube 115, or similar. The inline identifying tag readers or optical sensors 150, read, or otherwise sense, the passage of a pneumatic carrier 155 associated with an object being transported through the pneumatic tube system 100.

In one embodiment of the invention, the ID tags may be used to record the location and identify a pneumatic carrier 155 as it traverses through pneumatic tube 115. The information obtained is provided to the system control module 120 in order to keep a log of each pneumatic carrier's 155 location as it move through the pneumatic tube system 100. This creates an auditable trail indicating a chain of custody, allowing the user to know where the pneumatic carrier 155 and its contents have been and where they are going.

Also, system control module 120 may include database module 126 in signal communication with computer control module 122 (hereinafter "CCC module"). The system control module 120 receives carrier information from the tag readers at the pneumatic tube stations 105, 110 and logs the carrier 155 information into a database module 126. Additionally, the system control module 120 may receive carrier 155 location information from inline identifying tag readers or optical sensors 150 disposed throughout the pneumatic tube system 100 and log this information into a database module 126.

The database module 126 may be, for example, a relational database, a flat file database, fixed length record database, or any other data storage mechanism known or as yet undiscovered in the art. Further, the database module 126 may reside on a stand-alone server, or the same machine as the CCC module 122.

The CCC module 122 performs the function of a data manager and manages data by interpreting data stored in the database module 126 and sending routing commands to the pneumatic tube system 100 based on location data and delivery information collected from sending users. In one non-limiting embodiment, the CCC module 122 performs the functions of a data manager, while in another embodiment, there may be a separate module to serve as the data manager in order to interpret the data stored in the database module 126 and send routing commands to the CCC module 122 which then sends commands to the pneumatic tube system 100 based on location data and delivery information.

The pneumatic tube stations 105, 110, diverters 135 and 140, blower 130, and carrier receiving bin 145 are all in signal communication with, and controlled by, the CCC module 122. The CCC module 122 interprets the data in the database module 126 and generates commands in the form of signals to individual elements in the pneumatic tube system 100 to control the actions of the system 100. For example, the CCC module 122 may command the pneumatic tube system to activate the blower 130 to transport a carrier 155 through the pneumatic tube system 100. In response to data stored in the database module 126, the CCC module 122 may generate a signal to turn on blower 130, which blows air to move the carrier 155 throughout the pneumatic tube system 100. Similarly, the diverters 135 and 140 may be signaled by the CCC module 122 to route a carrier 155 to a particular branch in the pneumatic tube 115 to be delivered to a desired pneumatic tube station 105, 110.

The system control module 120 may also be configured to manage deliveries. The system control module 120 receives requests for delivery from, in one example, pneumatic tube station 110. The data input by a user at a sending station, for example, pneumatic tube station 105 identifying the ID tag is used to determine the physical location and routing of a carrier 155. Additionally, the system control module 120 uses the information from the sending pneumatic tube station 105 to determine how the carrier 155 should be delivered (i.e. secured, with alarms, etc.).

System control module 120 may also track a carrier 155 as it moves past inline identifying tag readers or sensors 150 in the pneumatic tube 115. The system control module 120 may generate records to show that a carrier 155 passed an inline identifying tag reader or sensor 150 at a certain time. These records may be used to ensure that a carrier 155 is routed correctly and in the correct order. Location recordation may also be used to troubleshoot and initiate error notifications, such as a stuck or lost carrier, or may be used to guarantee or verify a timely delivery for perishable contents (e.g., drugs or blood contents that must be refrigerated). Additionally, reports on chain of custody of carriers may be generated to keep record of who has a specific carrier at a specific point in time and where that carrier is located.

The system control module 120 may also control and verify delivery to receiving users at receiving pneumatic tube station 110. In order to initialize a shipment, the sending user enters information into the sending pneumatic tube station 105 that will be used to manage carrier 155 routing and delivery through the pneumatic tube system 100. The sending user prepares the contents of the carrier 155 for shipment. The contents of the 155 may be, for example, prescriptions, blood samples, patient file information, and the like.

After the sending user prepares the contents of the carrier 155 for shipping from the sending pneumatic tube station 105, the sending user may, in some non-limiting examples, scan the ID tag, scan the sending user ID, the ID of the desired receiving pneumatic tube station 110 through a handheld PDA (not shown).

In another useful embodiment, a more passive system may be used for the scanning of the delivery information. The identifier tags may be RFID tags, which can be read by an RFID identifying tag reader. In such an embodiment, the sending user at the sending pneumatic tube station 105 may move near the RFID identifying tag reader while holding the carrier 155 and its contents, and the reader will read and send the ID information from the sender, the carrier 155, and the contents inside the carrier 155 to the system control module 120. Thus, sending users may advantageously avoid physically scanning each identifier tag to obtain delivery information.

The scanned information from a handheld PDA is transmitted to the system control module 120 where it is stored in the database module 126 and interpreted by the CCC module 122. The CCC module 122 then determines the destination of a particular carrier 155, and the necessary command to route the carrier 155 properly. The CCC module 122 sends routing commands to the pneumatic tube system 100 to control the operations of the system.

Blower 130 and diverters 135 and 140 may be used to coordinate and direct the transportation of the carrier 155 throughout the pneumatic tube system 100 and between the storage compartment 145 and the pneumatic tube system 100. Carrier 155 moves through branches of the pneumatic tube 115 in the system under vacuum or pressure supplied by blower 130. The CCC module 122 sends a signal to the blower 130 to blow air to transport the carrier 155 at the appropriate time. As the carrier 155 moves through the system, the CCC module 122 controls the carriers' 155 routing by transmitting commands to diverters 135 and 140 which may change the position and/or direction of the carrier 155. In an alternative embodiment, a vacuum system may be used in place of a blower 130 to move carrier 155 through the pneumatic tube system 100 with negative air pressure.

In one embodiment, after the CCC module 122 routes the carrier 155 through the pneumatic tube 115 via the diverters 135 and 140, the carrier 155 travels to the receiving pneumatic tube station 110. At this pneumatic tube station 110, the carrier 155 is opened and the contents of the carrier 155 are extracted. The ID of the empty carrier 155 may then be scanned with a handheld PDA to keep record of which of the plurality of carriers are available from the storage compartment 145 for other shipments.

In an alternative embodiment, a slide plate 160 may be disposed in the pneumatic tube 115 at a location, in one non-limiting example, prior to the pneumatic tube station 110, although, in other non-limiting embodiments, slide plate 160 may be disposed at any location in the pneumatic tube system 100. The slide plate 160 may be used as a security measure, holding the carrier 155 from being delivered to pneumatic tube station 110 until the authorized receiving user scans their user ID. The sending user may be given the option by the handheld PDA prior to sending the carrier 155 from, in one example, a sending pneumatic tube station 105 of requiring the receiving user to scan the receiving user ID before retrieving the contents. If the sending user requires the receiving user to scan the receiving user ID, the CCC module 122 will engage the slide plate 160 and hold the carrier 155 in the tube 115 above until the receiving user scans the receiving user ID. If the sending user does not require this security option, the carrier 155 will be allowed to move through slide plate 160 and into the pneumatic tube station 110.

Figure 2:
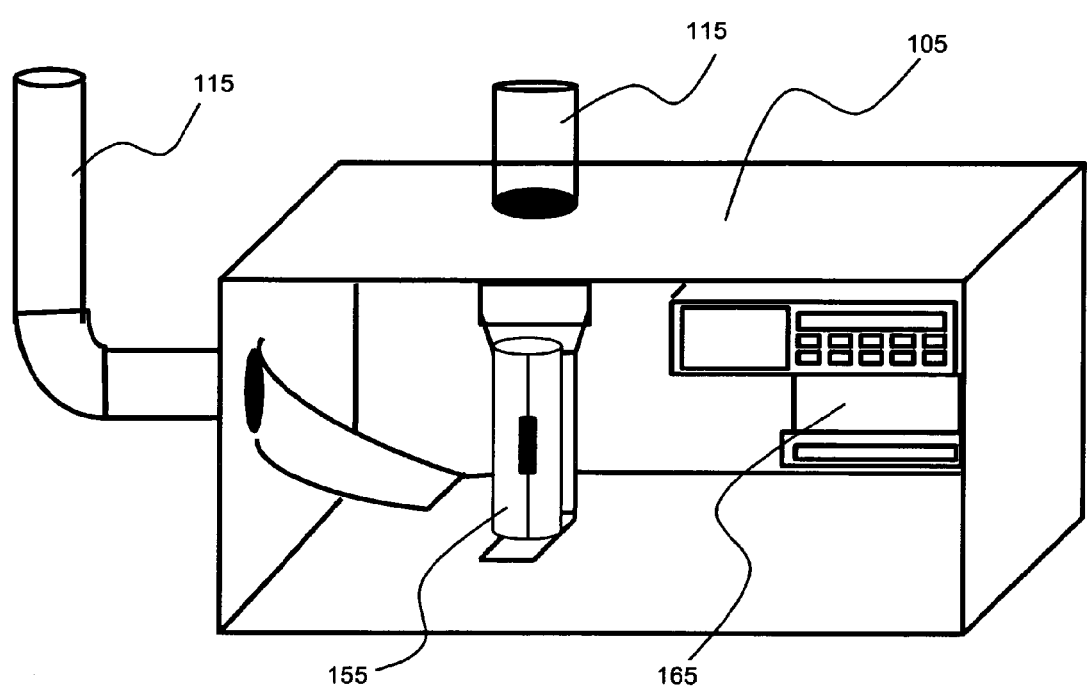
FIG. 2 is an isometric view of a pneumatic tube station incorporating the sealer system according to an embodiment of the invention.

Referring now to FIG. 2, there is shown a pneumatic tube station, such as pneumatic tube station 105 including a sealer system 165 according to an embodiment of the invention. The sealer system 165 is utilized for sealing the contents of a carrier bag 345 (shown in FIG. 3) as the carrier bag 345 is transported inside pneumatic carrier 155 from pneumatic tube station 105 through pneumatic tube system 100. In one non-limiting embodiment, the sealer system 165 includes a vacuum for evacuating the contents of the carrier bag 345 (shown in FIG. 3) prior to sealing the carrier bag 345.

Figure 3:
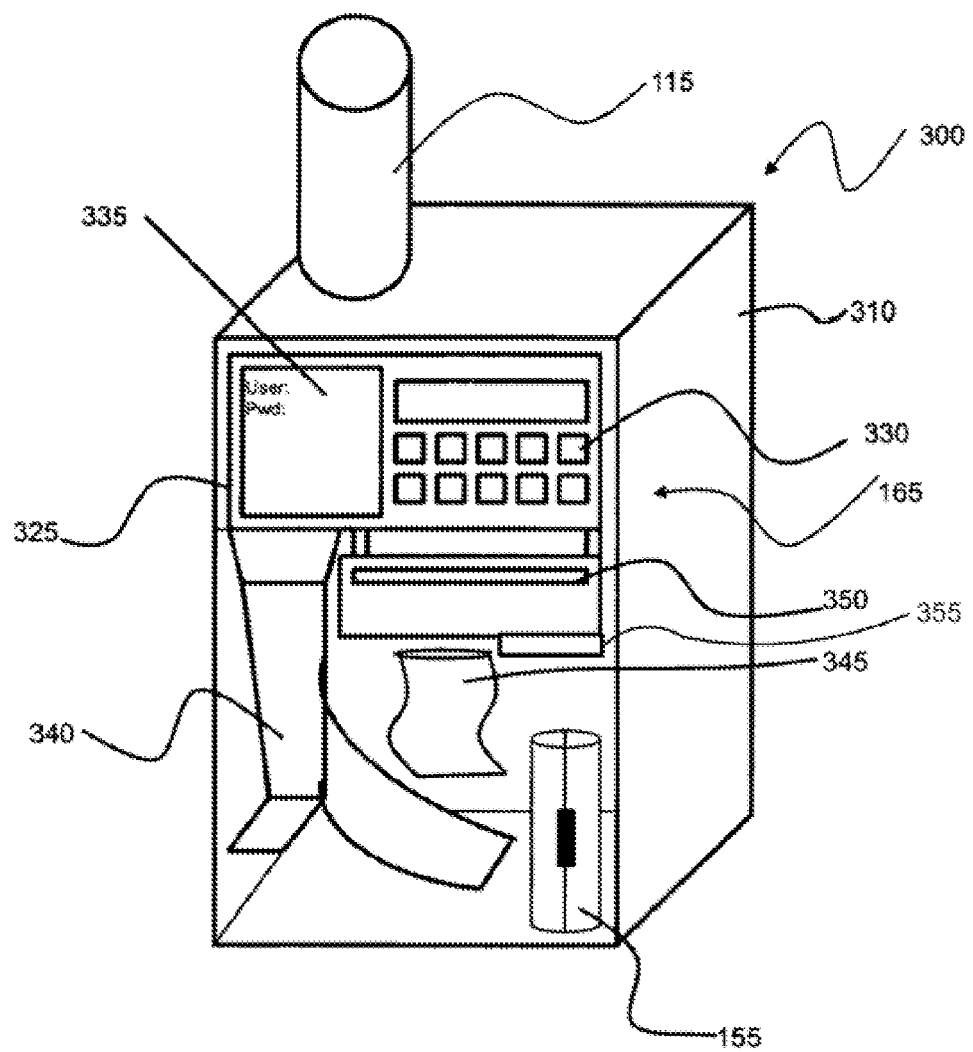
FIG. 3 is an isometric view of a pneumatic tube station incorporating the sealer system according to a preferred embodiment of the invention.

Referring now to FIG. 3, there is shown a pneumatic tube station 300 including a sealer system 165 (shown in FIGS. 1-2) according to an embodiment of the invention. The pneumatic tube station 300 is utilized in a pneumatic tube system 100) to transport a pneumatic carrier 155 between a plurality of pneumatic tube stations, such as pneumatic tube station 300. With the touch of a button, the pneumatic tube system 100 quickly and safely transports, in some non-limiting examples, pharmaceuticals, lab specimens, blood products and medical supplies between emergency rooms, labs, nurses' stations, operating rooms and pharmacies between a plurality of substantially similar pneumatic tube stations, such as pneumatic tube station 300.

The pneumatic tube station 300 includes a compact housing 310 containing holder 340 connected to a pneumatic tube 115 that is utilized for transporting and delivering a pneumatic carrier 155 to and from the pneumatic tube station 300. The pneumatic tube station 300 includes a user interface 325 having a control panel 330 that is utilized by a user to program heating times and heating temperatures for the sealer system 165. The user interface 325 includes a display 335 for providing real-time information based on programmed inputs entered by the user. In other non-limiting embodiments, the display 335 may include a touch-screen to receive inputs directly from a user touching the display 335. The user interface 325 is utilized to program, for example, destination information for sending a pneumatic carrier 155, priority information for pneumatic carrier 155, and security information (e.g., a personal identification number (PIN) for a user of pneumatic tube station 300. The holder 340 is configured such that a system user may place a pneumatic carrier 155 on the holder 340 and enter destination information through the control panel 330. Once all the appropriate information has been entered, the user will move the pneumatic carrier 155 into a pneumatic tube 115 for transport to a selected destination by placing the pneumatic carrier 155 onto the holder 340. The pneumatic tube station 300 is in signal communication with, and controlled by, the CCC module 122 (shown in FIG. 1). The CCC module 122 interprets the data in the database module 126 (FIG. 1) and generates commands in the form of signals to individual elements in the pneumatic tube system 100 to control the actions of the system 100. For example, the CCC module 122 may command the pneumatic tube system to activate the blower 130 (FIG. 1) to transport a pneumatic carrier 155 through the pneumatic tube system 100.

Further, sealer system 165 is provided to be utilized with a heat-sealing bag 345. The sealer system 165 effectively and securely seals, in one non-limiting embodiment, specimens and pharmaceuticals inside the sealing bag 345 thereby protecting the specimens and pharmaceuticals from jarring or spilling during transportation of the sealing bag 345 in the pneumatic carrier 155 as the pneumatic carrier 155 travels from the pneumatic tube station 300 to a remote destination. In one embodiment, the sealer system 165 is provided with a vacuum to evacuate air from the sealing bag 345, although in other non-limiting embodiments, sealer system 345 may not include such a vacuum. The sealing bag 345 is inserted into slot 350 to trigger a switch and cause sealer system 165 to apply first a vacuum to extract air from the bag and, second, heat to seal the open edge to securely protect the contents inside the sealing bag 345. As previously mentioned, the sealer system 345 that does not include a vacuum only applies heat to seal the open edge to securely protect the contents inside the sealing bag 345. The heating and cooling times required may be presented to the user through display 335 for selection at the beginning of the sealing process or it may be pre-programmed into sealer system 165. The display 335 provides an on-screen program that allows a user of pneumatic tube station 300 to select heating times and heating temperatures for the sealing bag 345 to be sealed. The display 335 displays various time and temperature parameters, and the user may select the appropriate illustrated parameters based on a particular composition of sealing bag 345 that is used. The user may elect to activate, manually, the sealer system 165. During sealing, the display 335 may display the status such as "heating" with a countdown of time remaining. It should be appreciated that pneumatic tube station 300 including the sealer system 165 may be provided to be installed in a wall, secured to a counter, or attached to a pedestal. It should also be appreciated that sealer system 165 may be provided as a stand-alone device so as to be used concurrently with any pneumatic tube station configuration.

Figure 4:
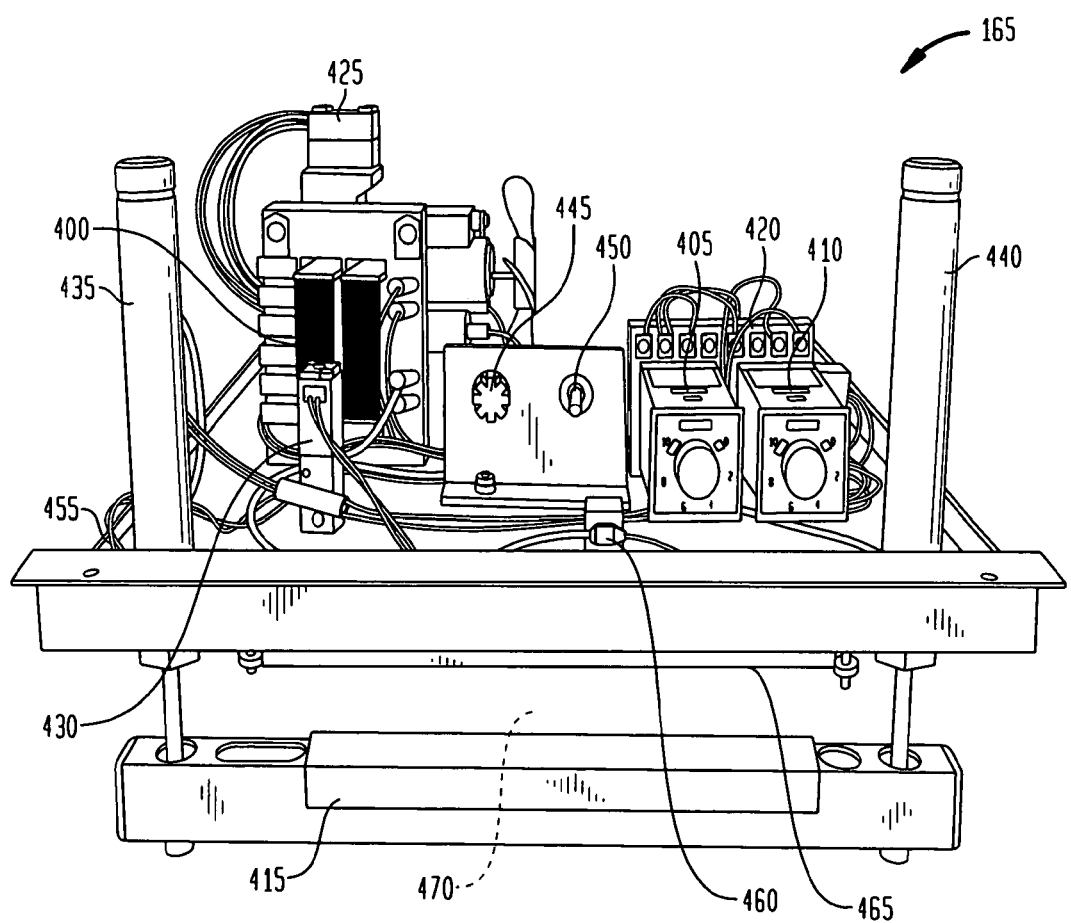
FIG. 4 is an exposed front perspective view of the sealer system shown in FIG. 1 according to a preferred embodiment of the invention.
Figure 5:
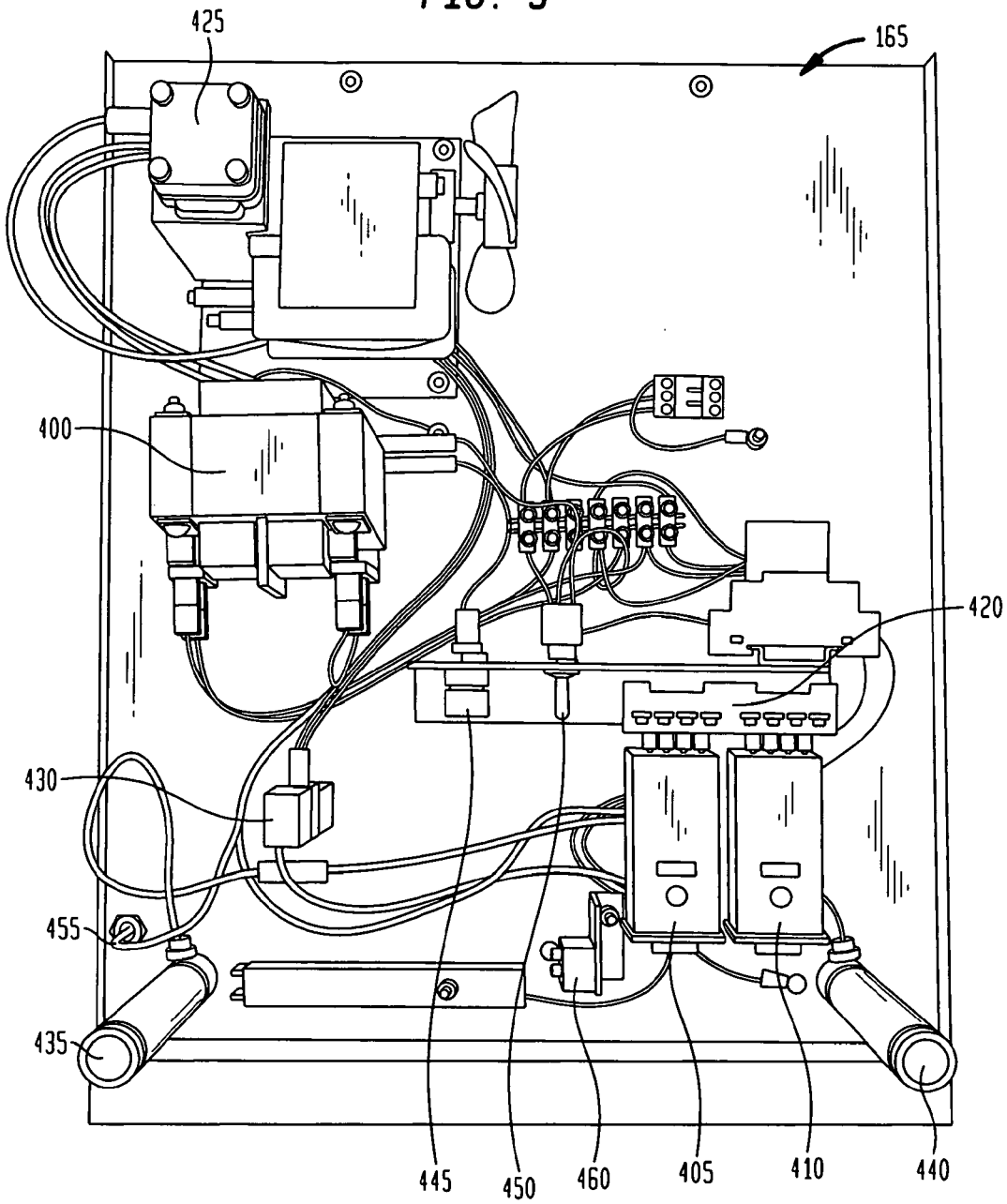
FIG. 5 is an exposed top perspective view of the sealer system shown in FIG. 1 according to a preferred embodiment of the invention.
Figure 6:
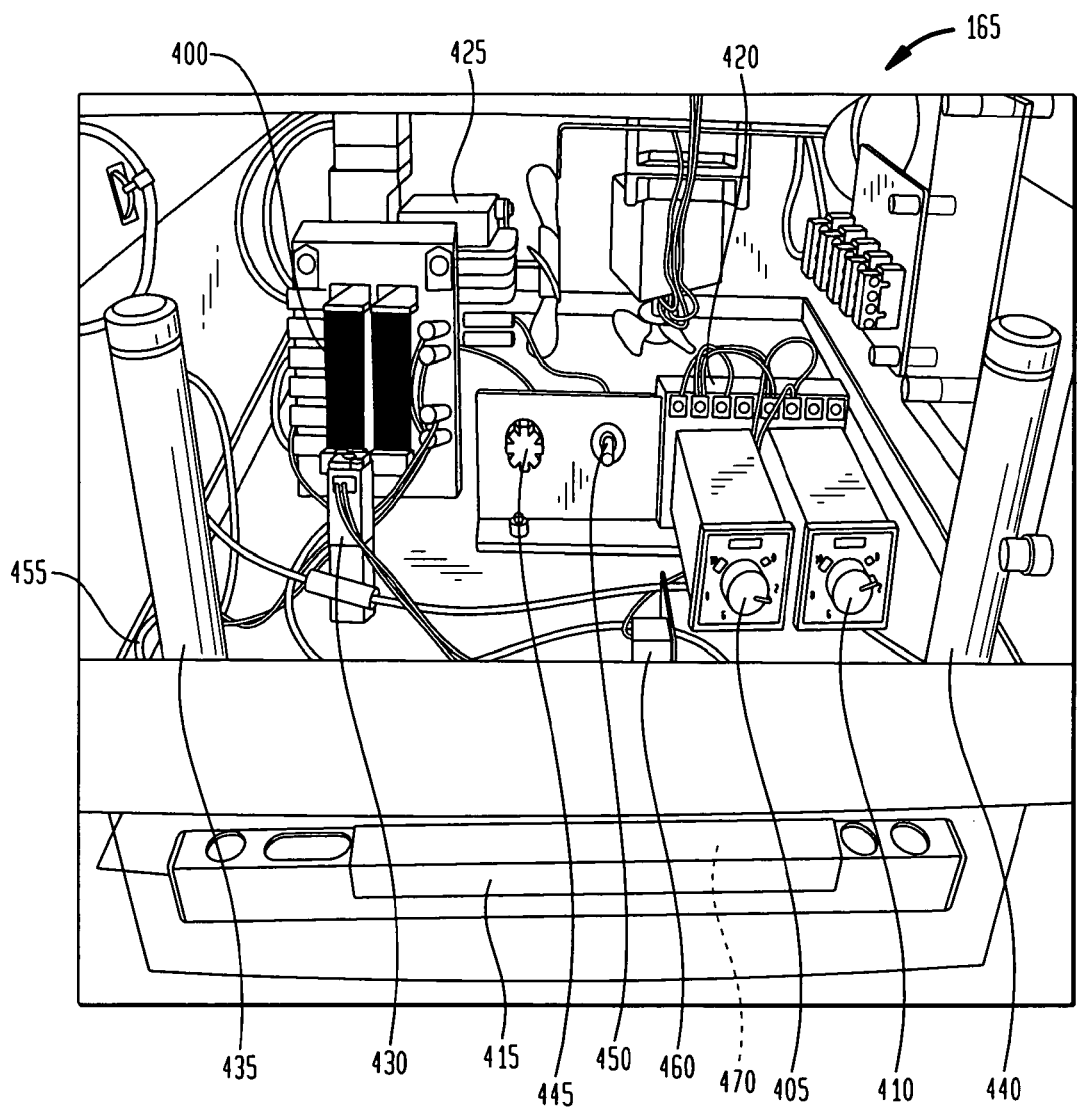
FIG. 6 is another exposed front perspective view of the sealer system shown in FIGS. 1 and 2.

Referring now to FIGS. 4-6, there is shown a sealer system 165 according to an embodiment of the present principles. As shown, the sealer system 165 includes a power transformer 400 electrically coupled to a plurality of time delay relays 405 and 410. Relay 405 is a relay switch where the variation of current in relay 405 controls the time that heat is applied to the heating rod 465 while relay 410 is a relay switch where the variation of current in the relay 410 controls the cooling time for the heating rod 465. The heating rod 465 cooperates with sealing strip 415 to grip a top surface and a bottom surface respectively of sealing bag 345 as sealing bag 345 resides in cavity 470 after which heat is applied through heating rod 465 which correspondingly heats sealing strip 415 to seal the top surface to the bottom surface. The time delay relays 405 and 410 are connected to relay sockets 420 and are further electrically connected to a vacuum compressor 425 for applying a vacuum to a sealing bag 345 thereby reducing the volume in sealing bag 345. Vacuum compressor 425 may any commercially available compressor that can extract, in one example, 0.28 cubic feet per minute of air at 10 Inches of mercury. In other non-limiting embodiments, sealer system 165 does not utilize vacuum compressor 425 to apply a vacuum to the sealing bag 345.

Also shown, sealer system 165 includes solenoid valve 430 coupled to compressor 425 and also coupled to a plurality of carbon steel piston rods 435 and 440. Solenoid valve 430 is utilized by the sealer system 165 to raise and lower the sealing strip 415 by controlling the flow of air to the piston rods 435 and 440 supplied from compressor 425. The sealer system 165 also includes a 10 Ampere fuse 445 (i.e., an overcurrent protection device), toggle switch 450, bypass switch 455, and coin switch 460 (i.e., a single pole-double-throw switch) to facilitate the operation of the various electrical components in the sealer system 165.

In operation, and as shown in FIGS. 3-6, the sealer system 165 includes a heating rod 465 and sealing strip 415 for receiving sealing bag 345. The sealing bag 345 comprises of two layers of plastic material, the bottom layer and a top layer, both of which are attached to each other on three sides and having an fourth open end. Sealer system 165 raises the sealing strip 415 when a sealing bag 345 is inserted into slot 350 causing the bottom layer of the sealing bag 345 to engage sealing strip 415 while the top layer engages the heating rod 465. The sealing strip 415 is raised by raising the piston rods 435 and 440, which are controlled by compressor 425. The sealing bag 345 is securely held in place between heating rod 465 and sealing strip 415 and cannot be removed until the end of the heat-sealing process. The plastic of the top and bottom layers have a similar melting point. After the sealing bag 345 is pressed between the heating rod 464 and sealing strip 415, in one non-limiting example, vacuum is applied to evacuate the contents of the sealing bag 345. Next, heat is applied to the heating rod 465, which melts the top and bottom layers of the sealing bag 345 bonding the top layer to the bottom layer forming a high-quality seal. Once the seal is formed, the sealer system 165 drops the sealing strip 415 by lowering the piston rods 435 and 440, thereby releasing the sealing bag 345. It should be appreciated that the width of the sealing bag may not exceed the width of the sealing strip 415, but in other non-limiting embodiments, any width may be utilized. The sealer system 165 receives the sealing bag 345 and seals the contents of the sealing bag 345 effectively, providing immediate and positive proof of sealing. The sealer system 165 produces a leak tight, sealed pouch, which cannot be removed from the sealer system 165 until the sealing process is complete. This time is typically set at 5 seconds, although any other time may be programmed into sealer system 165, in order to effectively seal the contents of the sealing bag 345.

Figure 7:
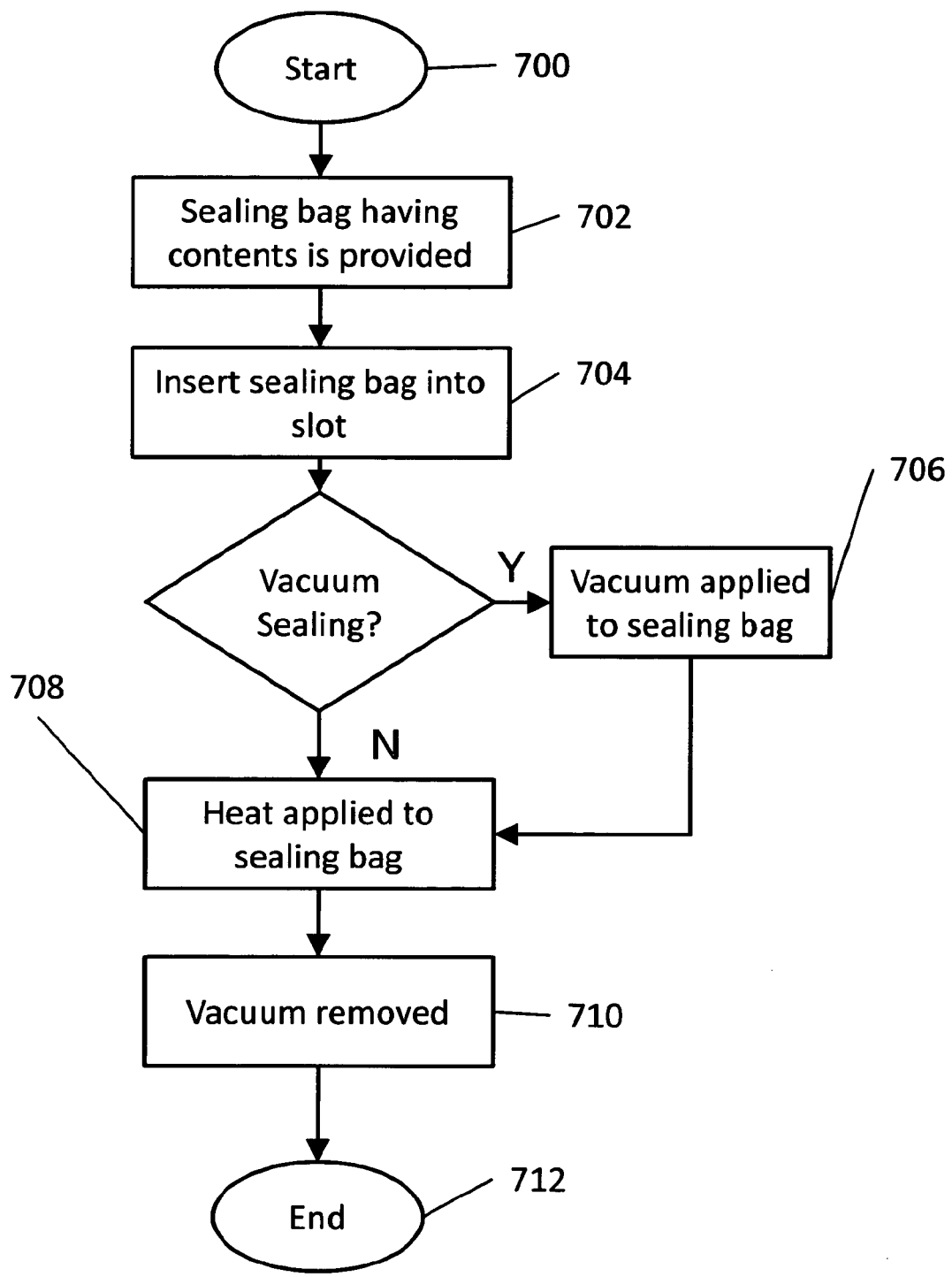
FIG. 7 is a flow chart depicting the method of sealing a carrier bag utilizing the sealer system according to a preferred embodiment of the invention.

As shown in FIGS. 3 and 7, the method for utilizing sealer system 165 for sealing contents in a sealing bag 345 is shown. As shown, the method starts in step 700 and proceeds to step 702, whereby a sealing bag 345 having contents to be sealed is provided. The sealing bag 345 may be any commercial grade bag that has an open edge and three sealed edges. The contents to be sealed, for example blood samples, are inserted into the sealing bag 345 and in step 704, the open edge is inserted into slot 350. The sealing bag 345 activates a coin switch 460 (shown in FIGS. 4-6) which causes compressor 425 to raise piston rods 435 and 440, thereby grasping sealing bag 345. If a vacuum assembly is provided with sealer system 165, then the process moves to step 706, where a compressor 425 applies a vacuum to the open edge of sealing bag 345 to evacuate the contents of air from the internal cavity of the sealing bag 345 for a predetermined amount of time before proceeding to step 708. Next in step 708, the relay 405 electrically activates the heating strip 415 to provide heat to the top and bottom surfaces of the sealing bag 345. Applying heat to the sealing bag 345 seals the open edge thereby encapsulating the contents of the sealing bag 345. Next, in step 710, the compressor 425 shuts off the vacuum to the piston rods 435 and 440 thereby releasing the piston rods 435 and 440. The method ends in step 712.

Figure 8A:
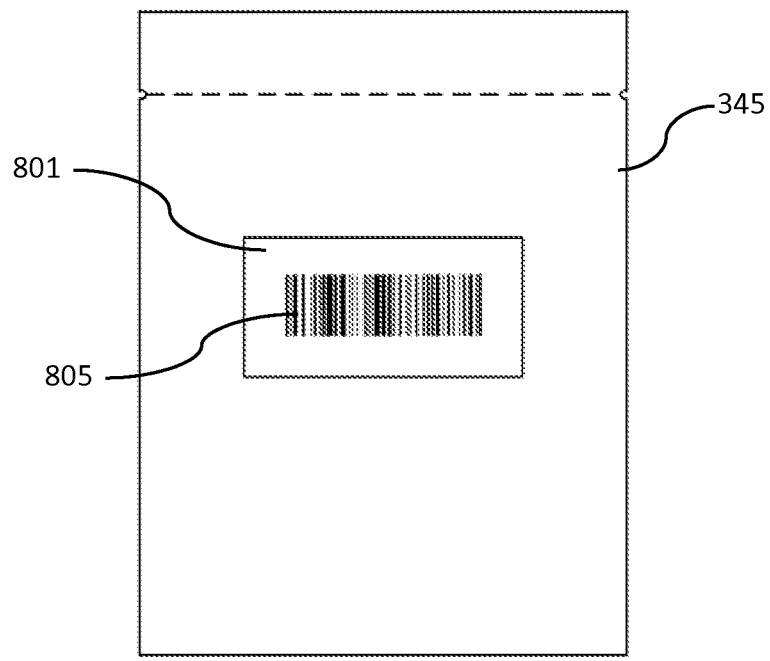
FIG. 8A is a front view of a carrier bag according to an embodiment of the present invention.
Figure 8B:
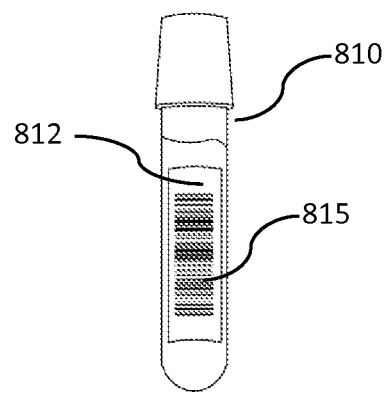
FIG. 8B is a front view of contents to be placed in the carrier bag according to an embodiment of the present invention.

In another embodiment, referring now to FIGS. 8A-8B, the carrier bag 345 of the present invention may further be provided with label 801 printed with a barcode 805 for ensuring that the contents of the carrier bag are securely delivered to authorized end users using the pneumatic tube system 100 of the present invention. Barcode 805 of label 801 affixed to carrier bag 345 is associated with or is identical to barcode 815 of label 812 affixed to contents 810 to be transported by the pneumatic tube system 100 within carrier bag 345. Barcode 815 on label 812 is used to identify the contents 810. As a result, label 801 is used to identify the contents 810 present within the carrier bag 345. The pneumatic tube station 300 shown in FIG. 3 may be provided with an optical barcode scanner 355 for scanning label 812 of contents 810 and/or label 801 of the carrier bag 345, or the labels may be scanned using a handheld PDA (not shown). The information collected from the label 801 by the scanners is used to identify the contents 810 within the carrier bag 345 to ensure the contents are delivered to the correct destination.

This embodiment is further described in more detail below with reference to contents 810 in the form of a blood sample. However, it should be understood that any contents may be used with the present invention, including other types of samples or specimens, medicines, hazardous materials, or the like. In addition, although this embodiment is described with reference to a barcode scanning system, the present invention may include any other identification technology known, or as yet undiscovered, within the scope of the present principles. For example, the carrier bag 345 may contain other identifying indicia, such as a two dimensional barcode, a symbol, an RFID tag or other radio frequency technology.

After the blood sample 810 is collected in a test tube, the sending user prepares the blood sample 810 for being transmitted through the pneumatic tube system 100 using a carrier 155 from a sending pneumatic tube station 105 (e.g., station 300) to a desired receiving pneumatic tube station 110. Labels 812 and 801 are generated using a printer (not shown), which identify the blood sample 810. Labels 801 and 812 are then affixed to carrier bag 345 and blood sample 810, respectively. Using a handheld PDA (not shown) or 355 attached to the sending tube station 300, the sending user may scan the barcode 805 on carrier bag 345. The sending use may also scan one or more of the following: barcode 815 on the blood sample, ID tag on the carrier 155, the sending user ID, and the ID of the desired receiving pneumatic tube station 110. The sending user may then insert the blood sample 810 into carrier bag 345, seal the carrier bag 345 using the sealer system 165 of the present invention, insert the sealed carrier bag 345 into the carrier 155, and deliver the carrier 155 to the sending pneumatic tube station 105 (e.g., 300). The scanned information from scanner 355 or handheld PDA is transmitted to the system control module 120 for tracking the contents of the carrier 155 and for routing the carrier 155 through the pneumatic tube system 100 to a desired destination as described above. Upon receipt of carrier 155 at the receiving pneumatic tube station 110, the receiving user may in turn empty carrier 155 and scan barcode 805 on carrier bag 345 to make sure that the blood sample 810 is routed to the correct destination. As such, the carrier bag 345 may remain sealed and does not have to be reopened to determine its contents. Accordingly, the blood sample 810 may remain safely sealed in the carrier bag 345 until it is delivered to the testing lab.

In another embodiment, label 801 for carrier bag 345 may be generated by the pneumatic tube station 300. In this embodiment, a sending user receives the blood sample 810 with a label 812 already affixed on the blood sample 810. The sending user scans the barcode 815 on blood sample 810 using the barcode reader 355 of the sending pneumatic tube station 300. The pneumatic tube station 300 in turn uses the information from label 812 to print label 801 containing a barcode identical to barcode 815, or a barcode that is associated with barcode 815.

It should be understood that this invention is not limited to the disclosed features and other similar method and system may be utilized without departing from the spirit and the scope of the invention. While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

The invention claimed is:

1. A system for packaging and transporting contents in a sealed bag through pneumatic tubing, comprising:
a bag having an open end, a plurality of closed ends, and an interior space for receiving said contents;
a pneumatic tube station comprising a sealer for receiving said open end of said bag and applying heat to said open end to seal said bag;
a carrier adapted for receiving said sealed bag; and
a computer module in signal communication with said pneumatic tube station and stationary and remote from said pneumatic tube station, wherein said computer module is configured to receive delivery information from said pneumatic tube station relating to routing said carrier from said pneumatic tube station to a destination;
wherein said pneumatic tube station is configured for sending said carrier containing said sealed bag to said destination by said pneumatic tubing.

2. The system of claim 1, wherein said bag comprises identifying indicia including identification information associated with said contents.

3. The system of claim 2, wherein said pneumatic tube station comprises a scanner for scanning said identifying indicia for reception of said identification information associated with said contents.

4. The system of claim 2, wherein identifying indicia is selected from a group consisting of a barcode, a two dimensional barcode, a symbol, and a RFID tag.

5. The system of claim 3, wherein said scanner is selected from a group consisting of an optical scanner and an RFID reader.

6. The system of claim 3, wherein said scanner comprises a handheld PDA.

7. The system of claim 2, wherein said identifying indicia is printed on a label affixed to said bag.

8. The system of claim 2, wherein said contents comprise identifying indicia associated with said identifying indicia of said bag.

9. The system of claim 2, wherein said pneumatic tube station further comprising a printer for generating said identifying indicia for said bag.

10. The system of claim 1, wherein said sealer includes a switch, a heating member and a sealing strip, wherein said heating member and said sealing strip grip said bag therebetween in response to activation of said switch.

11. The system of claim 10, wherein said switch is configured to be automatically activated upon insertion of said bag between said heating member and said sealing strip.

12. The system of claim 1, wherein said sealer further comprising a vacuum device for applying a vacuum to extract air from said interior space of said bag.

13. The system of claim 12, wherein said sealer comprises a relay switch programmed for controlling said vacuum applied to said bag.

14. The system of claim 1, wherein said sealer comprises a relay switch programmed for controlling said heat applied to said bag.

15. The system of claim 1, wherein said sealer is preprogrammed to cool said bag for a predetermined time.

16. The system of claim 1, wherein said at least one pneumatic tube station further comprising a user control member.

17. The system of claim 16, wherein said user control member is configured for allowing a user to input said delivery information.

18. The system of claim 16, wherein the user control member is configured for allowing a user to select a heating temperature from a plurality of heating temperatures, wherein the sealer applies heat to said bag based on the selected heating temperature.

19. The system of claim 16, wherein said user control member is selected from a group consisting of a graphic display, a touch-screen, a control panel, and combinations thereof.

* * * * *